(12) United States Patent
Nihonmatsu et al.

(10) Patent No.: US 9,849,810 B2
(45) Date of Patent: Dec. 26, 2017

(54) WALK-IN APPARATUS FOR VEHICLE SEAT

(71) Applicant: AISIN SEIKI KABUSHIKI KAISHA, Kariya (JP)

(72) Inventors: Hideo Nihonmatsu, Anjo (JP); Koichi Morita, Kariya (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/216,289

(22) Filed: Jul. 21, 2016

(65) Prior Publication Data

US 2017/0057381 A1 Mar. 2, 2017

(30) Foreign Application Priority Data

Aug. 31, 2015 (JP) ................................. 2015-170563

(51) Int. Cl.
*F16M 13/00* (2006.01)
*B60N 2/08* (2006.01)
*B60N 2/12* (2006.01)

(52) U.S. Cl.
CPC ........... *B60N 2/0881* (2013.01); *B60N 2/085* (2013.01); *B60N 2/0818* (2013.01); *B60N 2/12* (2013.01)

(58) Field of Classification Search
CPC ........ B60N 2/0715; B60N 2/07; B60N 2/062; B60N 2/06
USPC ..................... 248/429, 430, 424; 297/344.11
See application file for complete search history.

(56) References Cited

U.S. PATENT DOCUMENTS

| 4,455,009 A * | 6/1984 | Foster ................. | B60N 2/0705 248/429 |
| 6,698,835 B2 * | 3/2004 | Kojima ............... | B60N 2/0881 248/429 |
| 6,945,607 B2 * | 9/2005 | Kojima .................... | B60N 2/12 248/430 |
| 7,036,885 B2 * | 5/2006 | Ganot ...................... | B60N 2/20 297/341 |
| 7,959,229 B2 * | 6/2011 | Ishijima ............... | B60N 2/0296 297/337 |
| 8,167,372 B2 * | 5/2012 | Hazlewood .......... | B60N 2/0705 248/429 |

(Continued)

FOREIGN PATENT DOCUMENTS

JP 2010-52528 3/2010

*Primary Examiner* — Terrell McKinnon
*Assistant Examiner* — Michael McDuffie
(74) *Attorney, Agent, or Firm* — Oblon, McClelland, Maier & Neustadt, L.L.P.

(57) ABSTRACT

A walk-in apparatus for a vehicle seat includes: a seat rail slidably supporting a vehicle front seat; a slide lock mechanism non-slidably holding a seat cushion of the seat on the seat rail; an operation lever turnably supported by a seatback of the seat; and a link mechanism allowing the seat to be capable of sliding forward by releasing the operation of the slide lock mechanism via a connection unit based on a turning operation of the operation lever. The link mechanism includes a turning link turning based on a pulling force to the connection unit; a lock release link turning based on the turning of the turning link, and thus, releasing the operation of the slide lock mechanism; and a torque absorbing mechanism provided between the turning and lock release links, and limiting a pulling force to the turning link to a predetermined value or less.

6 Claims, 8 Drawing Sheets

(56) References Cited

U.S. PATENT DOCUMENTS

| | | | | |
|---|---|---|---|---|
| 2005/0103968 A1* | 5/2005 | Yamada | ............... | B60N 2/0705 248/429 |
| 2005/0205746 A1* | 9/2005 | Jung | ................... | B60N 2/0875 248/429 |
| 2010/0176265 A1* | 7/2010 | Kojima | ................ | B60N 2/0705 248/429 |
| 2011/0233367 A1* | 9/2011 | Mizuno | ................ | B60N 2/0705 248/429 |
| 2011/0233368 A1* | 9/2011 | Nihonmatsu | ........ | B60N 2/0705 248/429 |
| 2014/0353454 A1* | 12/2014 | Yamada | ............... | B60N 2/0705 248/430 |
| 2015/0034791 A1* | 2/2015 | Yamada | ............... | B60N 2/0843 248/429 |
| 2015/0151650 A1* | 6/2015 | Kim | .................... | B60N 2/0705 248/429 |
| 2016/0090011 A1* | 3/2016 | Stutika | .................... | B60N 2/12 248/429 |
| 2016/0121760 A1* | 5/2016 | Kuhley | ............... | B60N 2/0806 248/429 |

* cited by examiner

WALK-IN APPARATUS FOR VEHICLE SEAT

CROSS REFERENCE TO RELATED APPLICATIONS

This application is based on and claims priority under 35 U.S.C. §119 to Japanese Patent Application 2015-170563, filed on Aug. 31, 2015, the entire contents of which are incorporated herein by reference.

TECHNICAL FIELD

This disclosure relates to a walk-in apparatus for a vehicle seat which moves a vehicle seat forward in conjunction with an operation of reclining a seatback of the vehicle seat forward.

BACKGROUND DISCUSSION

When a passenger operates operating means such as an operation lever provided in a seatback of a front seat, a walk-in apparatus for a vehicle seat reclines the seatback of the front seat forward, and releases the operation of a lock mechanism of a seat slide apparatus at the same time. A seat cushion slides forward, and thus the passenger can get in and out a rear seat.

A lock release link of the lock mechanism of the seat slide apparatus is turned via a connection unit such as a cable which is pulled in conjunction with a turning operation of the operation lever, and a slide lock state is released according to the turning of the lock release link.

JP 2010-52528A (Reference 1) discloses a walk-in apparatus that is capable of releasing the operation of a lock mechanism by reclining a seatback of a vehicle seat forward, and is capable of sliding the seatback forward together with a seat cushion.

When slide locking is released, if a passenger further turns the operation lever in the same direction in a state where the lock release link has reached a limit of turning, an excessive pulling force is applied to the cable in the above-described walk-in apparatus. Thereupon, elongation or breakage of the cable may occur, thereby causing trouble in releasing the slide locking.

The walk-in apparatus disclosed in Reference 1 does not have a configuration in which elongation or breakage of the cable, which turns the slide lock release link, is prevented.

SUMMARY

Thus, a need exists for a walk-in apparatus which is not suspectable to the drawback mentioned above.

A walk-in apparatus for a vehicle seat according to an aspect of this disclosure includes: a seat rail that slidably supports a vehicle front seat; a slide lock mechanism that non-slidably holds a seat cushion of the vehicle front seat on the seat rail; an operation lever that is turnably supported by a seatback of the vehicle front seat; and a link mechanism that allows the vehicle front seat to be capable of sliding forward by releasing the operation of the slide lock mechanism via a connection unit based on a turning operation of the operation lever. The link mechanism includes a turning link that turns based on a pulling force applied to the connection unit; a lock release link that turns based on the turning of the turning link, and thus, releases the operation of the slide lock mechanism; and a torque absorbing mechanism that is provided between the turning link and the lock release link, and limits a pulling force, which is applied to the turning link from the connection unit, to a predetermined value or less which is set in advance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
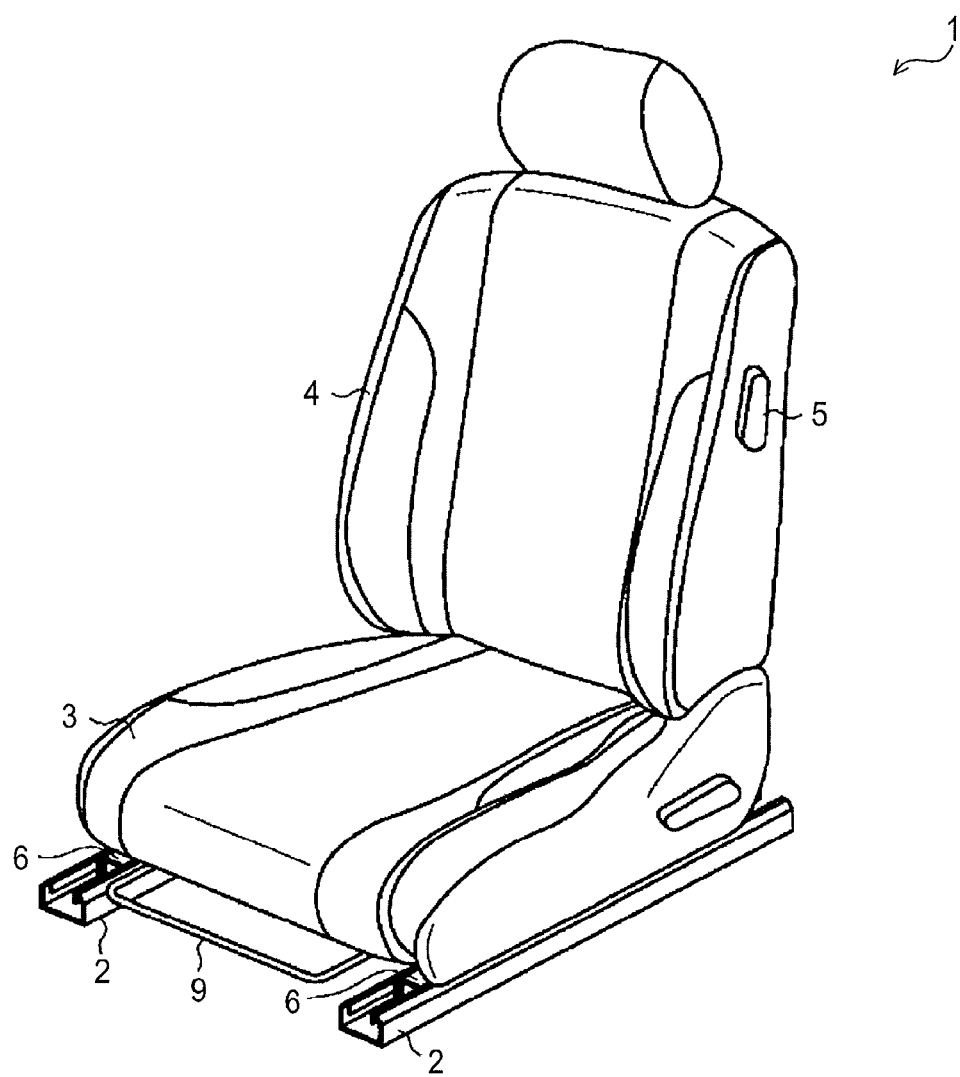
FIG. 1 is a perspective view of a vehicle front seat.

Hereinafter, an embodiment of a walk-in apparatus will be described with reference to the accompanying drawings. In a vehicle front seat 1 illustrated in FIG. 1, a seat cushion 3 is supported on a pair of lower rails 2 fixed to a floor of a vehicle such that the seat cushion 3 is capable of sliding in a forward and rearward direction via a seat slide mechanism.

A seatback 4 is supported by a rear end portion of the seat cushion 3 such that the seatback 4 is capable of reclining in the forward and rearward direction via a reclining mechanism.

An operation lever 5 for operating the walk-in apparatus is turnably supported by a side surface of the seatback 4. The seatback 4 reclines forward and the seat cushion 3 slides forward based on a turning operation of the operation lever 5, and thus, a passenger can easily get in and out a rear seat.

Hereinafter, the slide mechanism and the walk-in apparatus will be described. The pair of lower rails 2 are fixed to the floor with a distance therebetween being substantially the same as the lateral width of the seat cushion 3.

Figure 2:
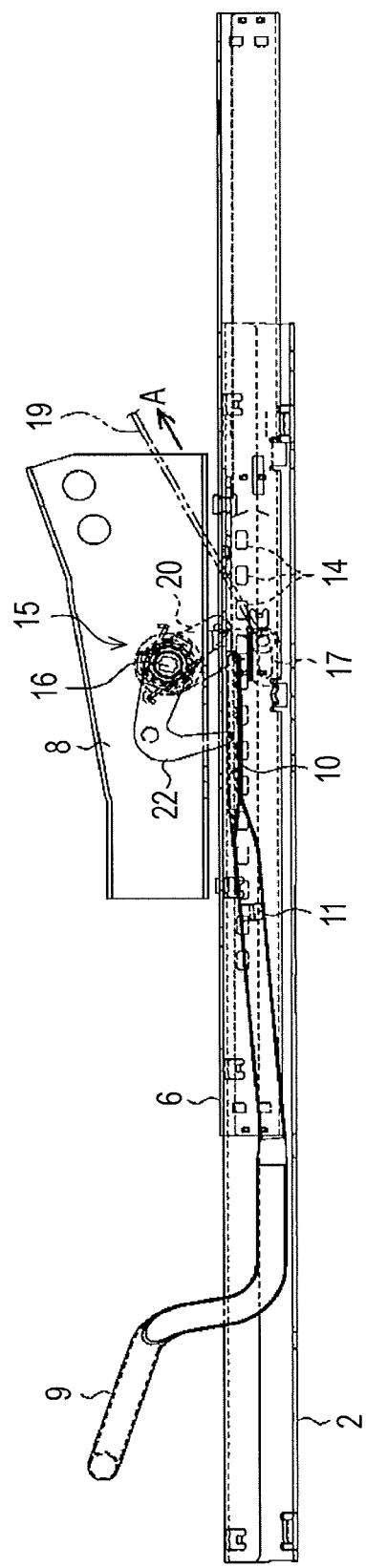
FIG. 2 is a side view of a walk-in apparatus.
Figure 3:
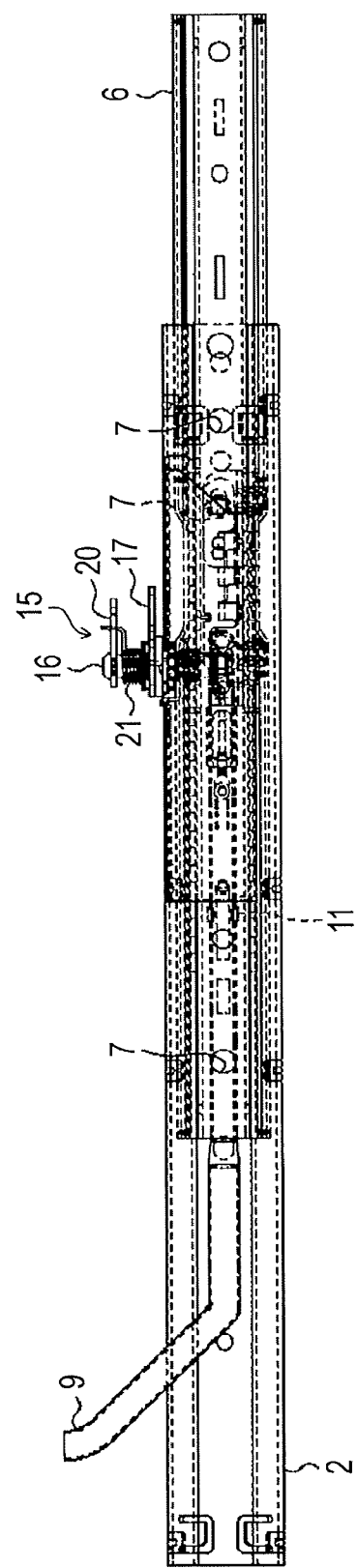
FIG. 3 is a top view of the walk-in apparatus.
Figure 4:
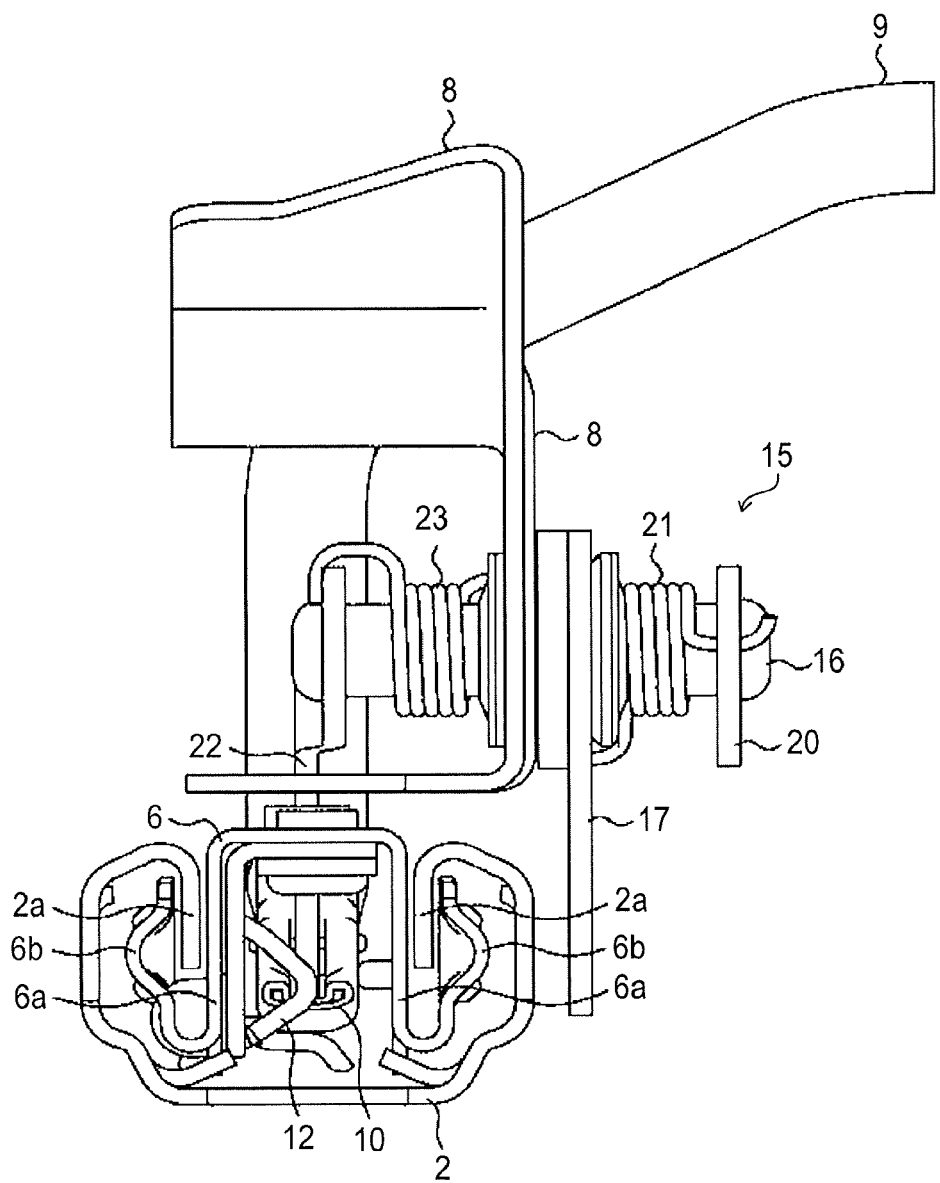
FIG. 4 is a front view illustrating main portions of the walk-in apparatus.

As illustrated in FIGS. 2 to 4, each of the lower rails 2 is formed into a groove shape in which a central portion of the lower rail 2 in a width direction (a rightward and leftward direction in FIG. 4) opens upward. Guide pieces 2a extending downward are respectively formed on both sides of an opening portion of the lower rail 2 in the width direction.

Upper rails 6 are respectively supported by the lower rails 2 such that each of the upper rails 6 is capable of sliding in a longitudinal direction (rightward and leftward direction in FIGS. 2 and 3) of the lower rail 2. The upper rail 6 forms a seat rail together with the lower rail 2. Each of the upper rails 6 includes a grooved portion 6a that opens downward, and guide pieces 6b which are respectively bent outward from a lower edge of the grooved portion 6a toward both sides in the width direction, and extend upward.

The upper rail 6 is inserted into the lower rail 2 such that each of the guide pieces 2a of the lower rail 2 is positioned between the grooved portion 6a and the guide piece 6b. The upper rail 6 is supported in such a way as to be capable of sliding relative to the lower rail 2 via rolling members (not illustrated) interposed between the guide pieces 6b and an inner surface of the lower rail 2.

As illustrated in FIG. 3, multiple attachment holes 7 are formed in an upper surface of the grooved portion 6a of each of the upper rails 6, and a lower bracket 8 illustrated in FIG. 2 is fixed onto both of the upper rails 6 via the attachment holes 7. The lower bracket 8 forms a portion of a seat cushion frame that holds the seat cushion 3. Accordingly, the front seat with the seat cushion 3 and the seatback 4 is slidably supported on the lower rails 2 via the upper rails 6.

As illustrated in FIG. 1, a slide handle 9 is disposed below a front end of the seat cushion 3. The slide handle 9 is formed by bending a metal pipe into a channel shape.

Figure 8:
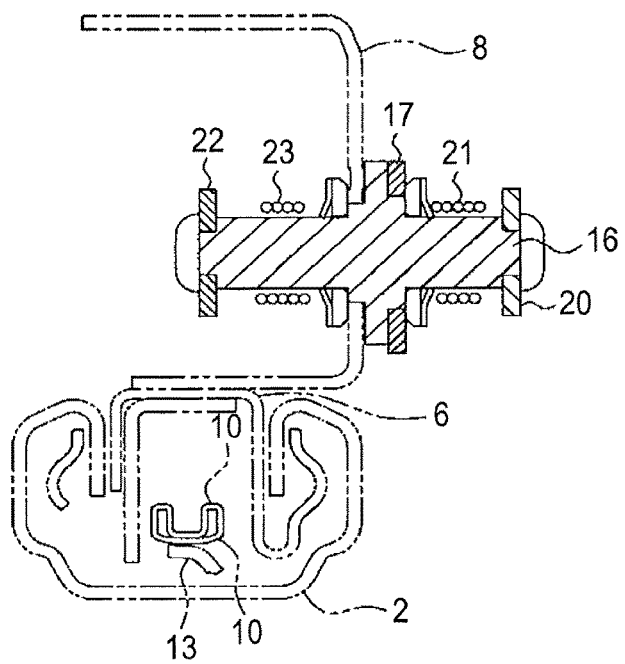
FIG. 8 is a sectional view taken along line VIII-VIII in FIG. 7.
Figure 9:
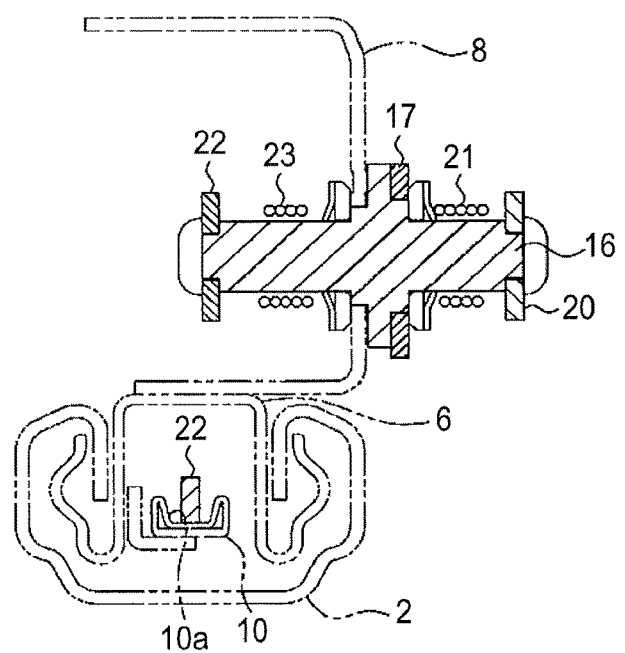
FIG. 9 is a sectional view taken along line IX-IX in FIG. 7.

As illustrated in FIG. 3, both end portions of the slide handle 9 respectively extend along the central portions of the lower rails 2 in the width direction. As illustrated in FIGS. 8 and 9, a slide lock release lever 10 having the section of a groove is formed in a tip end portion of each end portion, and opens upward.

The slide handle 9 is supported by the upper rails 6 such that the slide handle 9 is capable of vertically turning around a shaft portion 11 which is a center of turning and is provided in the vicinity of a base end portion of the slide lock release lever 10. If the slide handle 9 is lifted upward from an original position illustrated in FIG. 2, the slide lock release lever 10 turns downward around the shaft portion 11 which is a center of turning.

A spring (not illustrated) biases the slide handle 9 downward around the shaft portion 11 which is a center of turning, and when the slide handle 9 is not operated, the slide handle 9 is positioned as illustrated in FIG. 2.

As illustrated in FIG. 4, the upper rail 6 turnably supports a slide lock lever 12 through which it is allowed to select a state in which the upper rail 6 is capable of sliding relative to the lower rail 2, or a state in which the upper rail 6 is not capable of sliding relative to the lower rail 2, that is, the upper rail 6 is locked relative to the lower rail 2.

As illustrated in FIG. 9, a locking piece 13, which is provided on one end side of the slide lock lever 12, is in contact with a lower surface of the slide lock release lever 10. If the slide lock release lever 10 turns downward, the locking piece 13 is pressed downward.

The slide lock lever 12 includes a comb blade-shaped lock claw that is capable of passing through lock holes 14 (refer to FIG. 2) provided in the lower rail 2. In a state where the slide lock release lever 10 is positioned at the original position illustrated in FIG. 2, due to a biasing force of a spring (not illustrated), the lock claw is held at a position at which the lock claw passes through the lock holes 14, and the upper rail 6 is non-slidably fixed to the lower rail 2.

If the slide lock release lever 10 turns downward based on the upward pulling of the slide handle 9, as illustrated in FIG. 4, the locking piece 13 is pressed downward, and the slide lock lever 12 turns against the biasing force of the spring.

Thereupon, the lock claw comes out of the lock holes 14, and the upper rail 6 is capable of sliding relative to the lower rail 2.

A link mechanism 15 of the walk-in apparatus is provided in the lower bracket 8 mounted to an upper rail 6 of the pair of upper rails 6 which is positioned on one of both sides of a vehicle body, that is, is disposed in the vicinity of a door.

Going into detail, as illustrated in FIG. 4, a transmission shaft 16 extending in the width direction of the lower rail 2 and the upper rail 6 passes through the lower bracket 8 above the lower rail 2 and the upper rail 6, and is rotatably supported by the lower bracket 8. The transmission shaft 16 is mounted to the lower bracket 8 in such a way as to be positioned above a tip end portion of the slide lock release lever 10.

Figure 6:
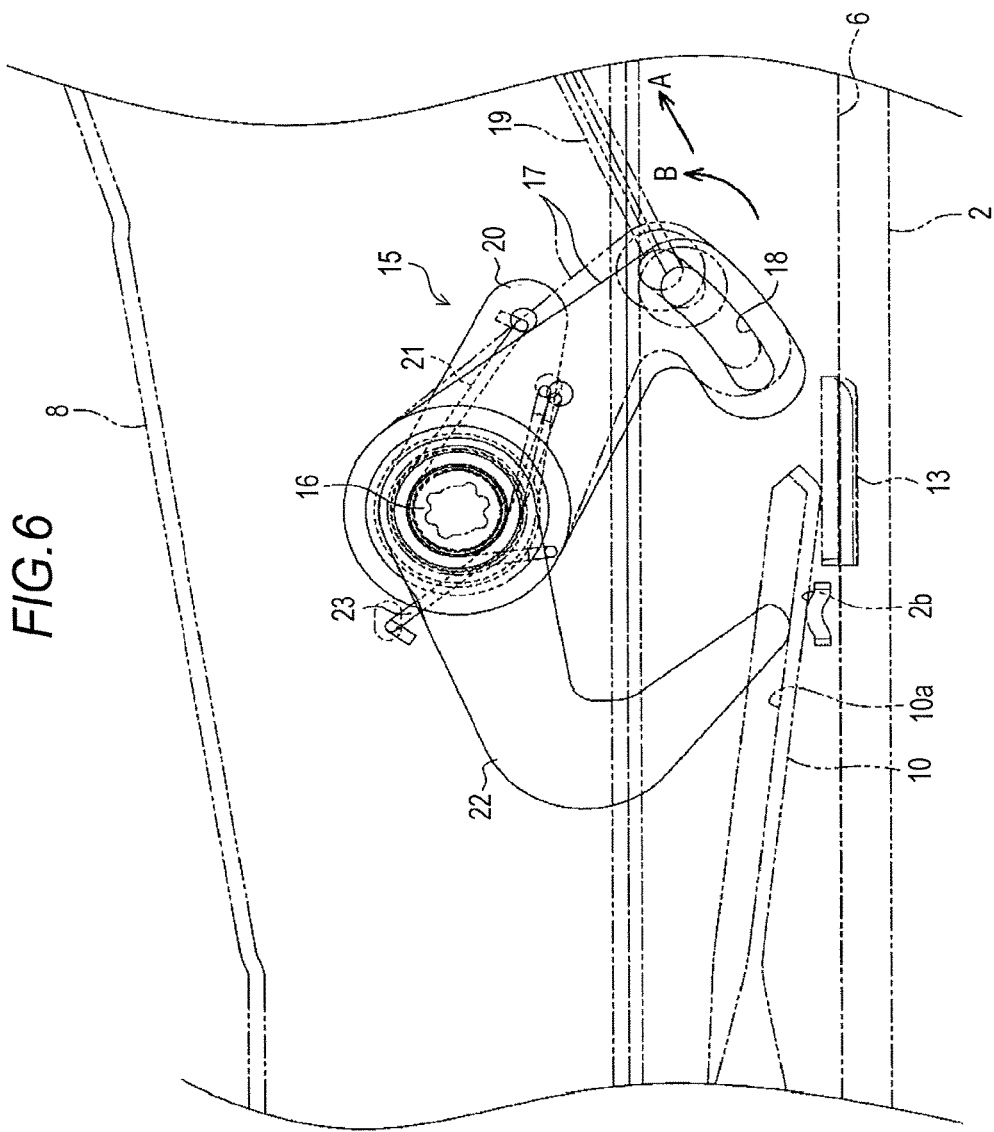
FIG. 6 is a side view illustrating the operation of the walk-in apparatus.

As illustrated in FIGS. 3, 4, and 6, the transmission shaft 16 turnably supports a base end portion of a turning link 17, which is formed of a metal flat plate, in the vicinity of a side surface of the lower bracket 8 which faces the center side of the seat. A tip end portion of the turning link 17 extends diagonally downward toward a side of the lower rail 2. The turning link 17 includes a long hole 18 formed along a turning direction of the turning link 17, and one end of a cable 19 is held by the long hole 18.

The other end of the cable 19 is connected to the operation lever 5. The cable 19 is pulled in the direction of arrow A illustrated in FIG. 7, based on a turning operation of the operation lever 5. Thereupon, the turning link 17 turns in the direction of arrow B. The one end of the cable 19 is capable of moving inside the long hole 18, and thus, it is possible to absorb slackening of the cable 19 which occurs when the operation lever 5 is not operated.

A base end portion of an intermediate link 20 is fixed to an end portion of the transmission shaft 16, which faces the center side of the seat cushion, such that the intermediate link 20 is not capable of rotating relative to the transmission shaft 16. A first torsional coil spring 21 is wound around an outer circumferential surface of the transmission shaft 16 between the intermediate link 20 and the turning link 17.

Figure 7:
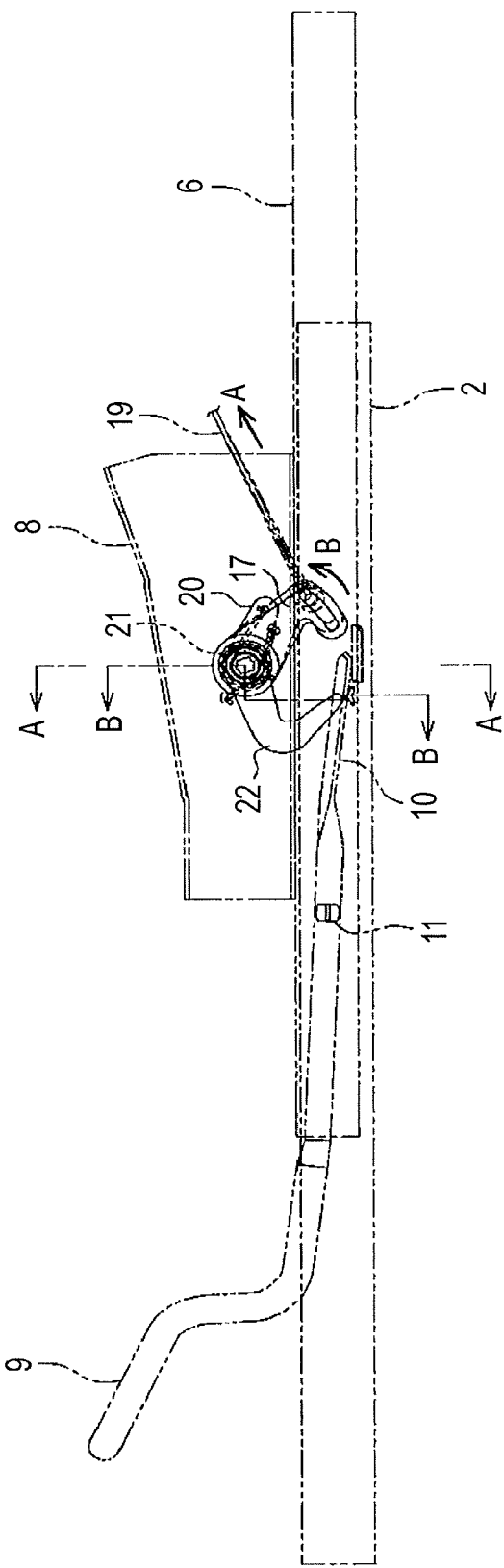
FIG. 7 is a side view illustrating the operation of the walk-in apparatus.

As illustrated in FIGS. 4 and 7, one end of the first torsional coil spring 21 is held by an intermediate portion of the turning link 17 positioned in a longitudinal direction of the turning link 17. The other end of the first torsional coil spring 21 is held by a tip end portion of the intermediate link 20. When the turning link 17 turns in the direction of arrow A, turning torque of the turning link 17 is transmitted to the transmission shaft 16 via the first torsional coil spring 21 and the intermediate link 20.

If the transmission shaft 16 is not allowed to rotate, the first torsional coil spring 21 is compressed in an energy storing direction due to the turning of the turning link 17, and only the turning link 17 turns.

A base end portion of a lock release link 22 is fixed to an end portion of the transmission shaft 16, which faces a side end of the seat cushion, such that the lock release link 22 is not capable of rotating relative to the transmission shaft 16. The lock release link 22 is formed of a hook-shaped metal plate, and is formed as illustrated in FIG. 9 such that a tip end portion of the lock release link 22 is in contact with a grooved recession 10a of the slide lock release lever 10.

Figure 5:
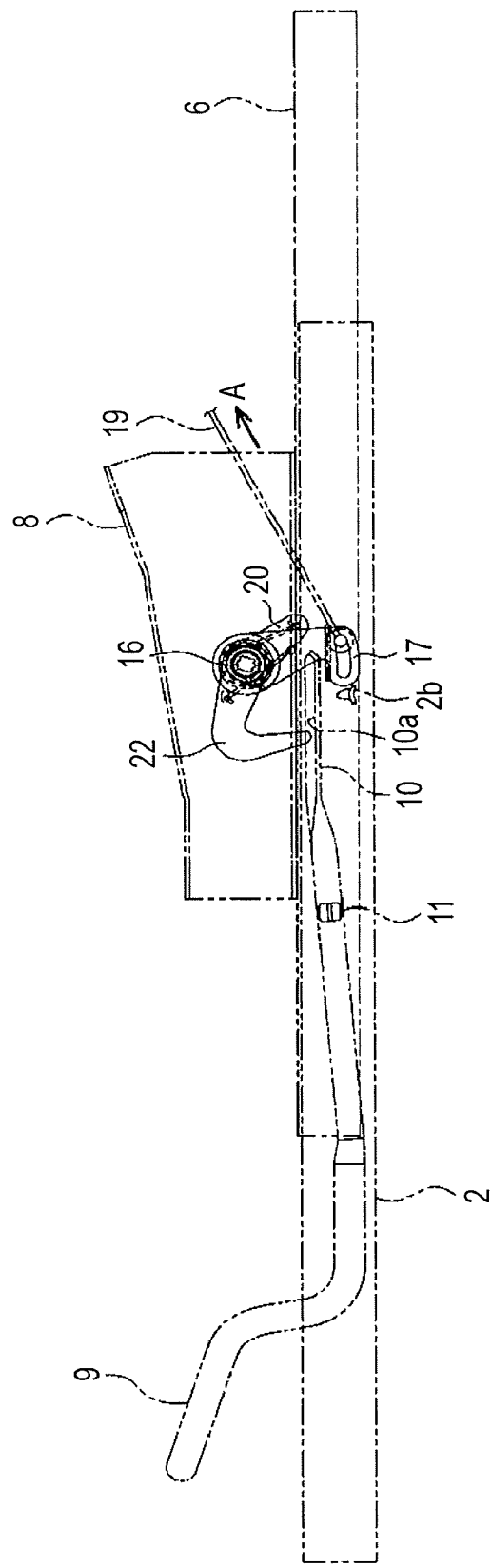
FIG. 5 is a side view illustrating the operation of the walk-in apparatus.

As illustrated in FIG. 5, the lock release link 22 is fixed to the transmission shaft 16 such that the tip end portion of the lock release link 22 is in contact with the recession 10a of the slide lock release lever 10 at the original position in a state where the operation lever 5 is not operated.

As illustrated in FIG. 6, if the transmission shaft 16 rotates based on the operation of the operation lever 5, the lock release link 22 turns, and the slide lock release lever 10 is pressed downward until coming into contact with a stopper 2b provided on a bottom surface of the lower rail 2.

A second torsional coil spring 23 is wound around an outer circumferential surface of the transmission shaft 16 between the lock release link 22 and the lower bracket 8. One end of the second torsional coil spring 23 is fixed to the lower bracket 8, and the other end of the second torsional coil spring 23 is fixed to the lock release link 22.

If the lock release link 22 turns from a position illustrated in FIG. 5 to a position illustrated in FIG. 6, energy is stored in the second torsional coil spring 23. Accordingly, if rotational torque is not applied to the transmission shaft 16 in the direction of arrow B, the lock release link 22 is turned to the original position illustrated in FIG. 5 by a biasing force of the second torsional coil spring 23.

Hereinafter, the operation of the seat slide mechanism and the walk-in apparatus with the aforementioned configuration will be described.

When it is desired to slide the seat cushion 3 in the forward and rearward direction, the slide handle 9 is lifted upward. Thereupon, the slide lock release lever 10 turns downward, and the slide lock lever 12 turns downward.

Since the upper rails 6 are capable of sliding relative to the lower rails 2 in this state, a passenger can slide the seat cushion 3 to a desired position. If the passenger slides the seat cushion 3 to the desired position, and then releases the slide handle 9, due to the biasing force of the spring, the slide lock release lever 10 returns to the original position illustrated in FIG. 2.

Thereupon, the slide lock lever 12 is engaged into the lock holes 14, the upper rail 6 is fixed to the lower rail 2, and the seat cushion 3 is non-slidably held at the desired position.

When a passenger operates the walk-in apparatus to get on or off a rear seat, if the passenger turns the operation lever 5, the turning link 17 turns in the direction of arrow B via the cable 19.

Thereupon, rotational torque in the same direction is transmitted to the intermediate link 20 via the first torsional coil spring 21, and the lock release link 22 turns via the transmission shaft 16 based on the rotational torque.

As illustrated in FIG. 7, the slide lock release lever 10 is pressed downward by the turning of the lock release link 22. As a result, the slide lock lever 12 turns, and the upper rails 6 are capable of sliding relative to the lower rails 2. The seatback 4 reclines forward based on the turning operation of the operation lever 5.

If the seat cushion 3 slides forward in this state, the passenger can get in and out the rear seat.

When the operation lever 5 is turned as described above, the slide lock release lever 10 comes into contact with the stopper 2*b* of the bottom surface of the lower rail 2 before the operation lever 5 reaches a limit of turning. Even if the passenger further turns the operation lever 5 in this state in the same direction, the transmission shaft 16 and the intermediate link 20 are not capable of turning in the same direction any more.

Thereupon, the first torsional coil spring 21 is compressed in the energy storing direction, and the turning link 17 turns as illustrated by a chain line in FIG. 6, and thus, the application of an excessive pulling force to the cable 19 is prevented.

It is possible to obtain the following effects according to the aforementioned walk-in apparatus.

(1) It is possible to slide the seat cushion 3 forward by pressing the slide lock release lever 10 downward via the cable 19 and the link mechanism 15 based on a turning operation of the operation lever 5 provided in the seatback 4.

(2) The first torsional coil spring 21 which absorbs excessive torque is interposed between the turning link 17, which is to be turned by a pulling force applied to the cable 19, and the lock release link 22 that presses the slide lock release lever 10 downward based on the turning of the turning link 17. Accordingly, it is possible to prevent the application of an excessive pulling force to the cable 19.

(3) It is possible to prevent the application of an excessive pulling force to the cable 19. Accordingly, even if a sufficient turning stroke of the operation lever 5 is ensured such that the lock release link 22 is pressed downward to a position at which the slide lock release lever 10 comes into contact with the bottom surface of the lower rail 2, that is, a position at which a slide lock state can be reliably released, it is possible to forestall elongation or breakage of the cable 19.

(4) It is possible to prevent the occurrence of an operational malfunction of the walk-in apparatus caused by elongation or breakage of the cable 19.

The following changes may be made to the aforementioned embodiment.

Instead of the first torsional coil spring 21, a clutch apparatus may be provided which is brought into press contact with the transmission shaft by a biasing force of a biasing mechanism such as a coil spring, and which is capable of transmitting rotational torque of a predetermined value or less.

The first torsional coil spring 21 may be interposed between the turning link 17 and the lock release link 22, and the intermediate link 20 may be omitted.

A connection rod or a link member may be used instead of the cable.

A walk-in apparatus for a vehicle seat according to an aspect of this disclosure includes: a seat rail that slidably supports a vehicle front seat; a slide lock mechanism that non-slidably holds a seat cushion of the vehicle front seat on the seat rail; an operation lever that is turnably supported by a seatback of the vehicle front seat; and a link mechanism that allows the vehicle front seat to be capable of sliding forward by releasing the operation of the slide lock mechanism via a connection unit based on a turning operation of the operation lever. The link mechanism includes a turning link that turns based on a pulling force applied to the connection unit; a lock release link that turns based on the turning of the turning link, and thus, releases the operation of the slide lock mechanism; and a torque absorbing mechanism that is provided between the turning link and the lock release link, and limits a pulling force, which is applied to the turning link from the connection unit, to a predetermined value or less which is set in advance.

With this configuration, when a passenger further turns the operation lever in the same direction in a state where the lock release link has turned to a limit of turning, the torque absorbing mechanism limits a pulling force which is applied to the turning link from the cable.

In the walk-in apparatus according to the aspect of this disclosure, it is preferable that a transmission shaft is mounted to a frame body that slidably supports the seat cushion on the seat rail, the turning link is turnably supported by the transmission shaft, the lock release link is fixed in such a way as not to be capable of rotating relative to the transmission shaft, and the torque absorbing mechanism is provided between the turning link and the lock release link.

With this configuration, the torque absorbing mechanism provided between the turning link and the lock release link limits a pulling force applied to the turning link.

In the walk-in apparatus according to the aspect of this disclosure, it is preferable that the torque absorbing mechanism includes a torsional coil spring between the turning link and the lock release link, which is compressed in an energy storing direction by the turning of the turning link based on a pulling force of the connection unit.

With this configuration, the torsional coil spring provided between the turning link and the lock release link limits a pulling force applied to the turning link.

In the walk-in apparatus according to the aspect of this disclosure, it is preferable that the torque absorbing mechanism includes an intermediate link which is mounted to the transmission shaft in such a way as not to be capable of rotating relative to the transmission shaft; and the torsional coil spring which is wound around the transmission shaft between the turning link and the intermediate link, and includes one end mounted to the turning link and the other end mounted to the intermediate link.

With this configuration, the torsional coil spring provided between the turning link and the intermediate link limits a pulling force which is applied to the turning link from the connection unit.

In the walk-in apparatus according to the aspect of this disclosure, it is preferable that, when the lock release link turns to a limit of turning, the torsional coil spring is compressed in the energy storing direction based on the turning of the turning link, and thus, limits a pulling force applied to the connection unit.

With this configuration, even if the operation lever is turned in the same direction in a state where the lock release link has turned to the limit of turning, the torsional coil spring is compressed in the energy storing direction, and thus, limits a pulling force which is applied to the turning link from the connection unit.

According to the walk-in apparatus according to the aspect of this disclosure, it is possible to stably release slide locking by preventing the occurrence of elongation of the connection unit.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A walk-in apparatus for a vehicle seat comprising:
    a seat rail that slidably supports a vehicle front seat;
    a slide lock mechanism that non-slidably holds a seat cushion of the vehicle front seat on the seat rail;
    an operation lever that is turnably supported by a seatback of the vehicle front seat; and
    a link mechanism that allows the vehicle front seat to be capable of sliding forward by releasing the operation of the slide lock mechanism via a connection unit based on a turning operation of the operation lever,
    wherein the link mechanism includes:
        a turning link that turns based on a pulling force applied to the connection unit;
        a lock release link that turns based on the turning of the turning link, and thus, releases the operation of the slide lock mechanism; and
        a torque absorbing mechanism that is provided between the turning link and the lock release link, and limits a pulling force, which is applied to the turning link from the connection unit, to a predetermined value or less which is set in advance, and wherein the torque absorbing mechanism includes:
            an intermediate link which is mounted to a transmission shaft in such a way as not to be rotatable relative to the transmission shaft, and
            a biasing member biasing the intermediate link and the turning link.

2. The walk-in apparatus for a vehicle seat according to claim 1,
    wherein the transmission shaft is mounted to a frame body that slidably supports the seat cushion on the seat rail, the turning link is turnably supported by the transmission shaft, the lock release link is fixed in such a way as not to be rotatable relative to the transmission shaft.

3. The walk-in apparatus for a vehicle seat according to claim 2,
    wherein the torque absorbing mechanism includes a first torsional coil spring between the turning link and the lock release link, which is compressed in an energy storing direction by the turning of the turning link based on a pulling force of the connection unit.

4. The walk-in apparatus for a vehicle seat according to claim 3,
    wherein the torque absorbing mechanism includes a second torsional coil spring which is wound around the transmission shaft between the turning link and the intermediate link, and includes one end mounted to the turning link and the other end mounted to the intermediate link.

5. The walk-in apparatus for a vehicle seat according to claim 4,
    wherein when the lock release link turns to a limit of turning, the second torsional coil spring is compressed in the energy storing direction based on the turning of the turning link, and thus, limits a pulling force applied to the connection unit.

6. The walk-in apparatus for a vehicle seat according to claim 1, wherein the biasing member corresponds to a second torsional coil spring that is wound around the transmission shaft between the turning link and the intermediate link, and that includes one end mounted to the turning link and the other end mounted to the intermediate link.

* * * * *